(12) United States Patent
Tamilarasan et al.

(10) Patent No.: US 8,595,535 B1
(45) Date of Patent: Nov. 26, 2013

(54) TECHNIQUES FOR MANAGING DATA STORAGE SYSTEMS USING ENERGY INFORMATION

(75) Inventors: Ashok Tamilarasan, Shrewsbury, MA (US); Joseph Perry, Sutton, MA (US); James W. Espy, Andover, MA (US)

(73) Assignee: EMC Corporation, Hopkinton, MA (US)

( * ) Notice: Subject to any disclaimer, the term of this patent is extended or adjusted under 35 U.S.C. 154(b) by 386 days.

(21) Appl. No.: 12/928,649

(22) Filed: Dec. 16, 2010

(51) Int. Cl.
  *G06F 11/30* (2006.01)
  *G06F 1/00* (2006.01)
  *G06F 1/26* (2006.01)
  *G06F 1/28* (2006.01)
  *G05D 23/00* (2006.01)

(52) U.S. Cl.
  USPC ........... 713/340; 713/300; 713/320; 713/324; 700/297; 700/299

(58) Field of Classification Search
  None
  See application file for complete search history.

(56) References Cited

U.S. PATENT DOCUMENTS

| | | | | |
|---|---|---|---|---|
| 5,666,538 | A * | 9/1997 | DeNicola | 713/320 |
| 7,793,126 | B2 * | 9/2010 | McGrane et al. | 713/320 |
| 8,028,183 | B2 * | 9/2011 | Bieswanger et al. | 713/322 |
| 8,055,926 | B2 * | 11/2011 | Piper et al. | 713/340 |
| 8,142,027 | B2 * | 3/2012 | Sakai | 353/52 |
| 8,223,025 | B2 * | 7/2012 | Stiver et al. | 340/584 |
| 8,311,764 | B1 * | 11/2012 | Robillard et al. | 702/130 |
| 2005/0049729 | A1 * | 3/2005 | Culbert et al. | 700/50 |
| 2011/0007746 | A1 * | 1/2011 | Mudigonda et al. | 370/395.21 |
| 2011/0301911 | A1 * | 12/2011 | VanGilder et al. | 702/136 |

OTHER PUBLICATIONS viridity, "Viridity EnergyCenter—Data Center Energy Management," www.viriditv.com/products/, 3 Pages, Dec. 2, 2010.
hp, "HP Data Center Environmental Edge—overview," http://h18000.www.l.hp.com/products/servers/solutions/datacentersolutions/environmentaledge/edge/index.html, 3 Pages, Dec. 2, 2010.

* cited by examiner

*Primary Examiner* — Ji H Bae
(74) *Attorney, Agent, or Firm* — Muirhead and Saturnelli, LLC

(57) ABSTRACT

Described are techniques for managing a data storage system. First energy information for each of one or more enclosures of the data storage system is determined. Second energy information for the data storage system based on information including the first energy information for the one or more enclosures is determined. It is determined whether any of the first energy information for each of the one or more enclosures and the second energy information for the data storage system are within a predetermined amount of one or more associated thresholds. If it is determined that any of the first energy information for each of the one or more enclosures and the second energy information for the data storage system are within a predetermined amount of one or more associated thresholds, one or more actions are taken prior to reaching the one or more associated thresholds.

20 Claims, 8 Drawing Sheets

TECHNIQUES FOR MANAGING DATA STORAGE SYSTEMS USING ENERGY INFORMATION

BACKGROUND

1. Technical Field

This application generally relates to data storage systems, and more particularly to techniques used in connection with management of data storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with data storage systems, a portion of physical devices may be included in a single enclosure. In some existing systems, when temperature of a single enclosure exceeds a threshold, all drives in the enclosure are powered down resulting in data of those drives being unavailable.

SUMMARY OF THE INVENTION

In accordance with one aspect of the invention is a method for managing a data storage system comprising determining first energy information for each of one or more enclosures of the data storage system, each of said enclosures including components of the data storage system; determining second energy information for the data storage system based on information including the first energy information for the one or more enclosures; determining whether any of said first energy information for each of the one or more enclosures and said second energy information for said data storage system are within a predetermined amount of one or more associated thresholds; and if it is determined that any of said first energy information for each of the one or more enclosures and said second energy information for said data storage system are within a predetermined amount of one or more associated thresholds, taking one or more actions prior to reaching said one or more associated thresholds. The first energy information for each enclosure of the data storage system may include a power consumption metric and a temperature metric. The second energy information may include an estimate of power consumed by standby power supplies based on a state of each of said standby power supplies. The step of determining first energy information for each of the one or more enclosures may include polling each of the one or more enclosures for information on power consumption and temperature. The method may also include polling each of the one or more enclosures for power consumption information for each occurrence of a first time interval; polling each of the one or more enclosures for temperature information for each occurrence of a second time interval; and determining, for each of the one or more enclosures, a current power consumption metric at each occurrence of the second time interval using power consumption information collected during a plurality of occurrences of the first time interval. Each of the enclosures may include one or more of a computer processing unit, a storage device, a power supply, an external interface component, and a fan. The one or more actions may include powering down or up a component of the data storage system based on an amount of power consumed by the component as defined in accordance with a first storage tier including said component, said first storage tier being one of a plurality of defined multiple storage tiers, and sending a user notification. At each occurrence of said second time interval, an average power consumption and a maximum power consumption may be determined for each of said one or more enclosures with respect to energy information collected for said each enclosure during a predetermined time window, and wherein, at each occurrence of said second time interval, an average temperature and a maximum temperature may be determined for each of said one or more enclosures with respect to temperature information collected for said each enclosure during said predetermined time window. At each occurrence of said second time interval, an average power consumption and a maximum power consumption may be determined for the data storage system with respect to energy information collected during a predetermined time window, and wherein, at each occurrence of said second time interval for each standby power supply, a current, average and maximum amount of power consumed by said each standby power supply may be determined with respect to energy information collected during said predetermined time window. A first of said one or more actions may be performed in accordance with attributes of physical storage devices of the data storage system. The first action may include selectively powering on or powering off a storage device. The first action may select a device and consider whether the device is a disk device or a solid state storage device. A first of the one or more actions may be performed in accordance with data storage configurations. The first action may select a device for powering on or powering off and may consider whether the device is currently configured for user data. The first action may select a device for powering on or powering off and may consider whether the device is currently configured in a RAID group. The first action may power off or power on devices on a per RAID group level. The first action may select a device for powering off which is not configured for storing user data.

A first of the one or more actions may include migrating data from a first device of first enclosure to a second device of second enclosure if the first enclosure has first energy information within a predetermined amount of an associated threshold and data of said first device is categorized as critical data. A plurality of storage tiers may be defined, each of said storage tiers including devices having a same set of attributes.

The first device may belong to a first storage tier of devices having a first set of attributes, and the second device may belong to a second storage tier of devices having a second set of attributes and at least a portion of said first set of attributes may be included in said second set.

In accordance with another aspect of the invention is a computer readable medium comprising code stored thereon for managing a data storage system, the computer readable medium comprising code that: determines first environmental information for each of one or more enclosures of the data storage system, each of said enclosures including components of the data storage system; determines second environmental information for the data storage system based on information including the first environmental information for the one or more enclosures; determines whether any of said first environmental information for each of the one or more enclosures and said second environmental information for said data storage system are within a predetermined amount of one or more associated thresholds; and if it is determined that any of said first environmental information for each of the one or more enclosures and said second environmental information for said data storage system are within a predetermined amount of one or more associated thresholds, takes one or more actions prior to reaching said one or more associated thresholds.

In accordance with another aspect of the invention is a data storage system comprising: a first enclosure including a plurality of computer processors; a plurality of second enclosures including a plurality of storage devices; a computer readable medium comprising code thereon that: determines enclosure-level environmental information for each of the first enclosure and plurality of second enclosures; determines data storage system-level environmental information for the data storage system based on information including sets of enclosure-level environmental information for the first enclosure and the plurality of second enclosures; determines whether any of the sets enclosure-level environmental information and the data storage system-level environmental information are within a predetermined amount of one or more associated thresholds; and if it is determined that any of the sets of enclosure-level environmental information and the data storage system-level environmental information are within a predetermined amount of one or more associated thresholds, taking one or more actions prior to reaching said one or more associated thresholds. The data storage system-level environmental information may include an estimation of power consumed by standby power supplies based on a state of each of said standby power supplies, and wherein one of said second enclosures may be directly connected to said first enclosure and another of said second enclosures may be indirectly connected to said first enclosure through said one of said second enclosures.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
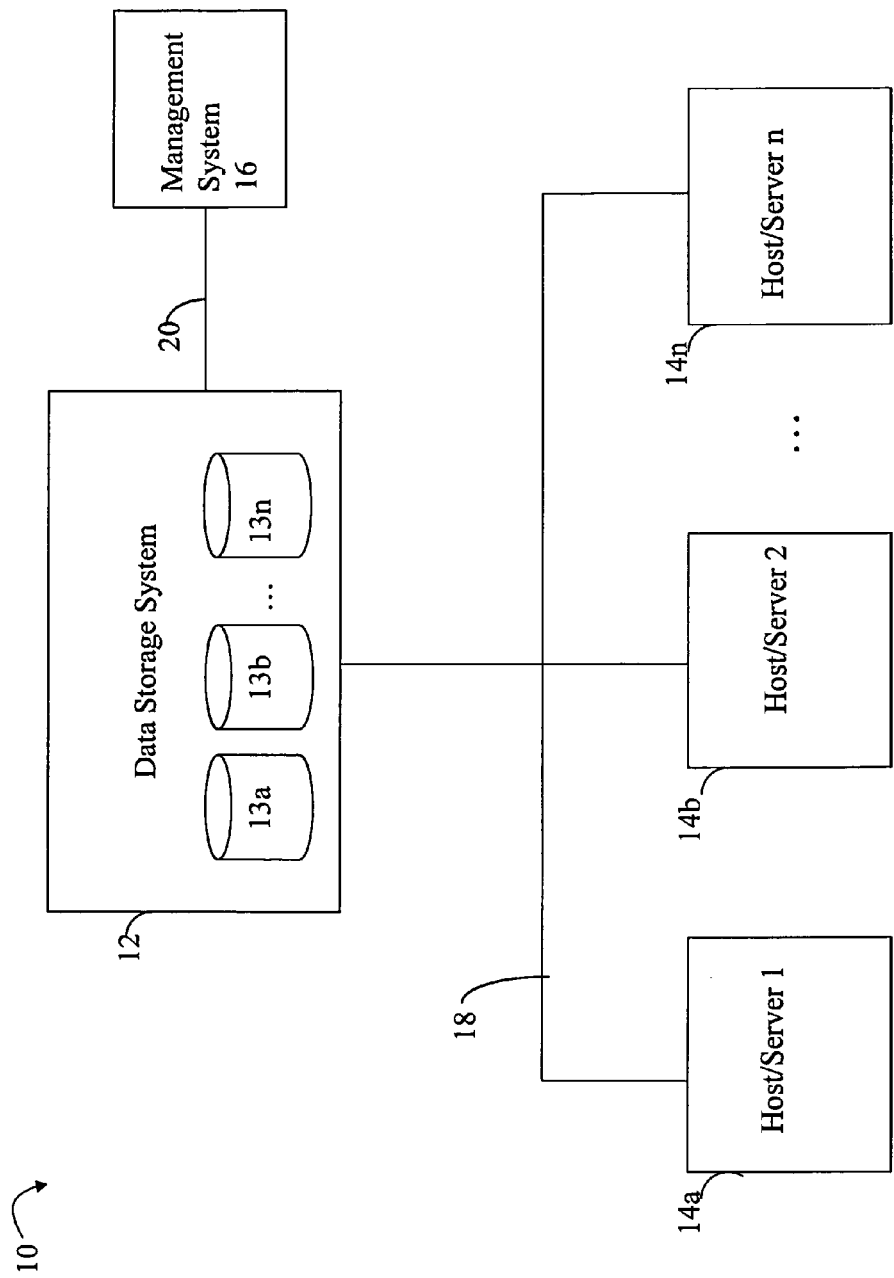
FIG. 1 is an example of an embodiment of a system that may utilize the techniques described herein.

Referring to FIG. 1, shown is an example of an embodiment of a system that may be used in connection with performing the techniques described herein. The system 10 includes one or more data storage systems 12 connected to server or host systems 14*a*-14*n* through communication medium 18. The system 10 also includes a management system 16 connected to one or more data storage systems 12 through communication medium 20. In this embodiment of the system 10, the management system 16, and the N servers or hosts 14*a*-14*n* may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14*a*-14*n* may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14*a*-14*n* and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14*a*-14*n* and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14*a*-14*n*, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Described in following paragraphs are techniques that may be used in connection with management of a data storage system using energy information. Energy information may include, for example, one or more power consumption metrics and one or more temperature metrics, such as an ambient temperature indicating the temperature of air external to an enclosure and/or data storage system, and an enclosure internal temperature where an enclosure may include one or more components as described in more detail elsewhere herein. Energy information may be obtained for each enclosure of components in a data storage system. An enclosure may include one or more different physical components such as, for example, storage devices or drives, power supplies, and/or storage system processors or CPUs. Additionally, energy information may be determined for the data storage system as an aggregate of energy information of the enclosures and also based on power consumed by one or more standby or backup (e.g., secondary) power supplies used by the data storage system, for example, upon the occurrence of a power failure (e.g., primary power source failure). In connection with techniques herein, the data storage system may be managed based on the foregoing energy information collected on an enclosure-level basis and also on a data storage system level basis.

Figure 2:
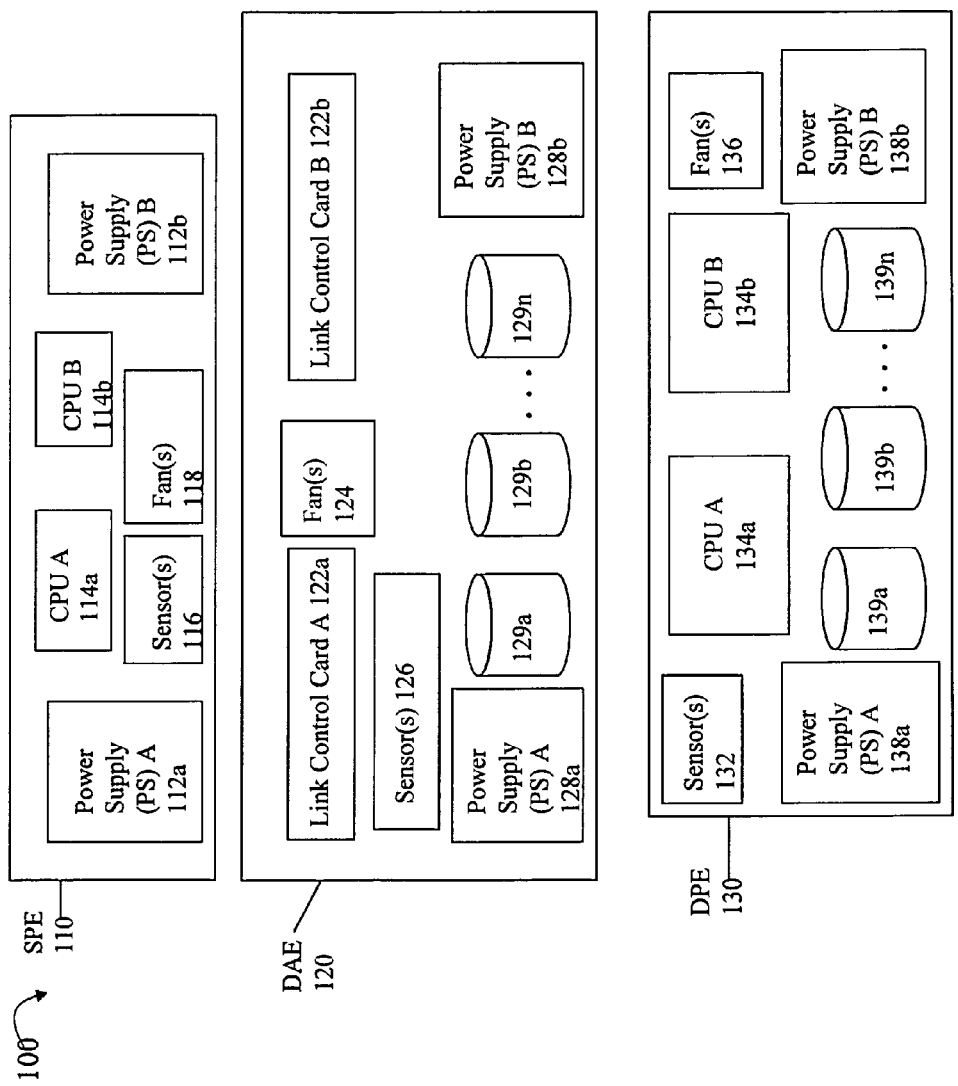
FIG. 2 is an example illustrating different enclosures and components thereof that may be included in an embodiment in accordance with techniques herein.

Referring to FIG. 2, shown is an example of different types of enclosures that may be included in an embodiment of a data storage system in accordance with techniques herein. The example 100 includes a storage processor enclosure (SPE) 110, a disk array enclosure (DAE) 120, and a disk array processor enclosure (DPE) 130. A data storage system may include, for example, an SPE and one or more DAEs, or a DPE and one or more DAEs.

An SPE 110 may include storage processors or CPUs of the data storage system. In one embodiment, the SPE 110 may include two CPUs denoted as CPUs A and B (114a, 114b). The SPE 110 may also include two enclosure power supplies, power supply (PS) A 112a, PS B 112b, one or more sensors 116, and one or more fans 118. PS A 112a and PS B 112b may supply power to the components of the SPE 110. PS A 112a and PS B 112b may be powered by an external or primary power source, such as AC power provided by a source external with respect to the data storage system. The sensors 116 may include a temperature sensor that records the ambient temperature for the SPE 110. The SPE 110 may include other components than as illustrated in the example 100 for use with techniques herein.

A DAE 120 may include data storage devices of the data storage system. In one embodiment, the DAE 120 may include data storage devices 129a-129n, link control card (LCC) A 122a, LCC B 122b, one or more sensors 126, power supply (PS) A 128a, PS B 128b, and one or more fans 124. PS A 128a and PS B 128b may supply power to the components of the DAE 120. PS A 128a and PS B 128b may be powered by an external or primary power source, such as AC power provided by a source external with respect to the data storage system. The sensors 126 may include a temperature sensor that records the ambient temperature for the DAE 120. The DAE 120 may include other components than as illustrated in the example 100 for use with techniques herein. Each of the LCCs 122a, 122b may function as the interface between the components within the DAE and components outside or external to the DAE. As will be described in following paragraphs, another enclosure, such as the SPE, may be connected to, and communicate with, the DAE through the LCCs 122a, 122b.

A DPE 130 may include storage processors or CPUs and also storage devices of the data storage system. In one embodiment, the DPE 130 may include two CPUs denoted as CPUs A and B (134a, 134b). The DPE 130 may also include two enclosure power supplies, power supply (PS) A 138a, PS B 138b, one or more sensors 132, one or more fans 136, and data storage devices 139a-139n. PS A 134a and PS B 134b may supply power to the components of the DPE 130. PS A 134a and PS B 134b may be powered by an external or primary power source, such as AC power provided by a source external with respect to the data storage system. The sensors 132 may include a temperature sensor that records the ambient temperature for the DPE 130. The DPE 130 may include other components than as illustrated in the example 100 for use with techniques herein.

It should be noted that the one or more sensors of an enclosure may provide for obtaining one or more temperature measurements. As described above, a sensor may be used to record ambient temperature of air flowing into and/or surrounding the enclosure (e.g., indicative of the temperature of air external to the enclosure). A sensor may also be used to record the temperature within the disclosure. An embodiment may include one or more of the foregoing temperature sensors. Additionally, the power supplies within the enclosures illustrated in FIG. 2 may include an integrated sensor for sensing and reporting the amount of power utilized. However, an embodiment may alternatively include a power sensor as a separate sensor which is not integrated with the power supplies.

The data storage devices (e.g., denoted 129a-129n of the DAE 120 and 139a-139n of the DPE 130) may be any one or more types of data storage devices or drives having different data storage device characteristics. For example, in one embodiment, an enclosure may include FC (fibre channel) disk drives, SATA disk drives, or solid state drives (SSDs) such as flash-memory based storage drives. The number and/or type of devices included in an enclosure may also vary with the particular enclosure and/or embodiment.

In some embodiments in accordance with techniques herein, the data storage system may have two or more CPUs. In one embodiment in which a data storage system has two CPUs or storage processors, the data storage system may include either the SPE or the DPE, but not both, in combination with one or more DAEs. A DAE and a DPE may each have two enclosure power supplies and an SPE may have 2 or 4 enclosure level power supplies (although two are illustrated in elements 110 for exemplary purposes). As noted above, each such enclosure level power supply (PS) such as denoted by elements 112a, 112b, 128a, 128b, 138a and 138b, may be a primary power source such as AC power for components of the enclosure. Each PS of an enclosure may have two internal fans or blowers which are integrated with the PS as a single unit. Each enclosure may have 2-4 external fans. It should be noted that the foregoing numbers of components such as fans, CPUs or storage processors, power supplies, and the like, are examples of what may be included in an embodiment in accordance with techniques herein.

As described in more detail below, a CPU or storage processor of an SPE or DPE may connect to a DAE through an LCC of the DAE. The enclosures as illustrated may include replicate hardware components, such as two or more enclosure level power supplies, a DAE which includes two LCCs, an SPE or DPE including two CPUs or storage processors, and the like. In an embodiment where an enclosure includes two CPUs, two LCCs and the like, a first of each of the pair may be denoted as the "A" components and a second of the pair may be denoted as the "B" components.

Figure 3B:
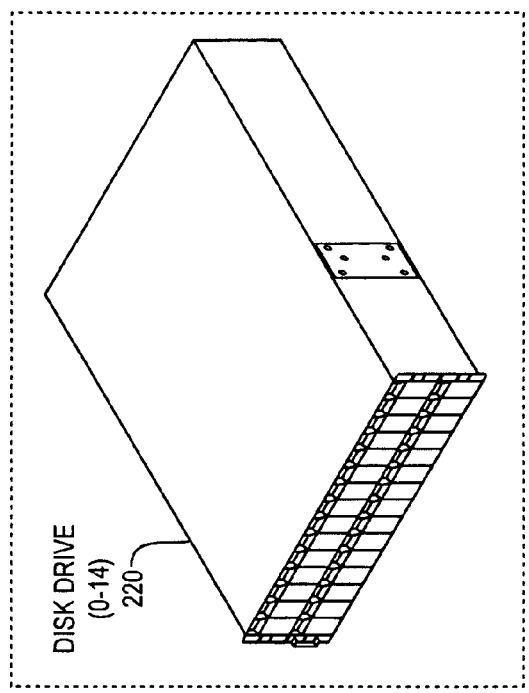
FIG. 3 is an example illustrating an arrangement of enclosures in a rackmount arrangement.
Figure 3A:
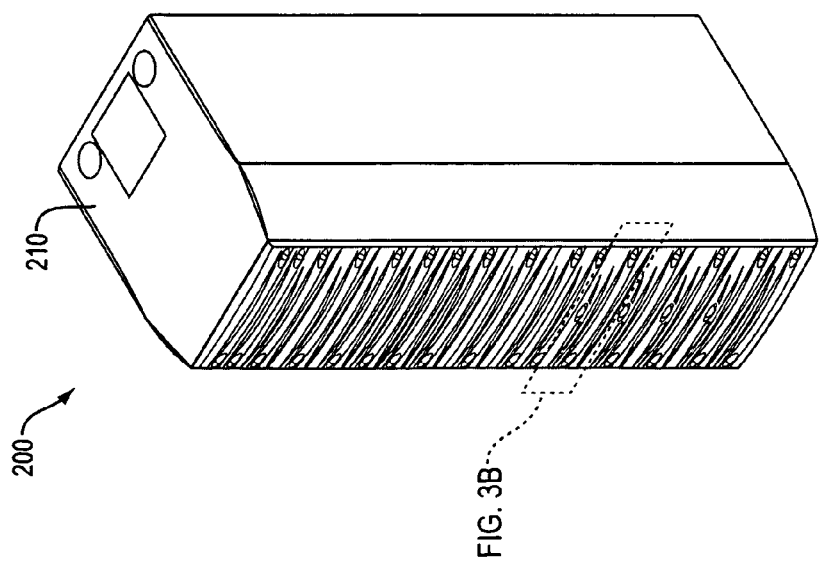

Referring to FIG. 3, shown is an example configuration of a data storage system in accordance with techniques herein. The example 200 illustrates an exemplary rack mount configuration where the enclosures are included in racks in a rack mount cabinet 210. Each rack may include one of the enclosures such as illustrated by 220 where the enclosure may be a DAE illustrated as including disk drives 0-14.

In addition to the enclosures, the data storage system may also include standby, backup or secondary power supplies (SPSs) to provide power to selective components of the data storage system upon the occurrence of a primary power failure. For example, a data storage system may include two SPSs which are batteries providing power in the event of a power failure of a primary power source. In a system with DAE and SPE enclosures, SPSs may be used to power data storage processors or CPUs and one of the DAEs in the event of a power failure. In an embodiment including a DPE rather than an SPE, SPSs may alternatively be used to power CPUs or storage processors and storage devices/disks in the DPE.

The different enclosures included in a data storage system may be connected to each other in a variety of different arrangements. Some examples are described in following paragraphs and figures.

Figure 4:
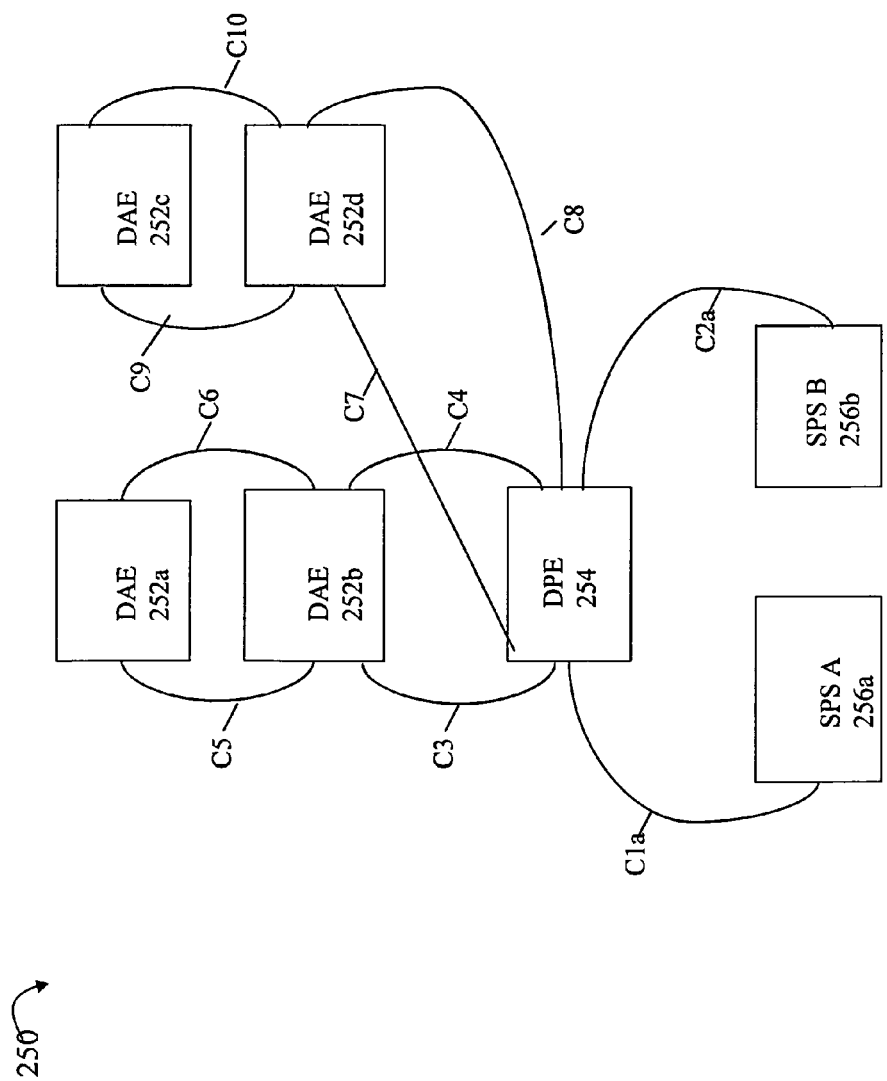
FIGS. 4, 5 and 6 are examples illustrating connections between components in different enclosure arrangements that may be used in an embodiment in accordance with techniques herein.

Referring to FIG. 4, shown is an example of a physical layout or arrangement of enclosures and SPSs (standby power supplies) in an embodiment of a data storage system including a DPE and multiple DAEs. The example 250 includes DPE 254, 4 DAEs denoted 252a-d, and two SPSs 256a, 256b. Connections C1-10 illustrate communication connections between enclosures for use in with techniques herein. As described in more detail elsewhere herein, the connections C3-C10 may be used to obtain energy information from the enclosures. Connections C1a and C2a may be used to obtain information from the data storage system SPSs about the state of the SPSs. In turn, such state information may be used in determining an estimate of energy information about the SPSs as described in more detail below.

As will be described in more detail elsewhere herein, in one embodiment illustrated in FIG. 4 (and also in FIGS. 5 and 6), CPU A of DPE 254 may use connection C1a to obtain state information from SPS A 256a and CPU B of DPE 254 may use connection C1a to obtain state information from SPS B 256b. CPU A may then obtain the state information from CPU B regarding SPS B using messages communicated between CPUs A and B of DPE 254. In a similar manner, CPU B may obtain the state information from CPU A regarding SPS A. From such state information, the energy information about SPS A and SPS B may be estimated.

A port of a first of the CPUs (CPU A) of the DPE 254 may be connected C3 to a first LCC (LCC A) of the DAE 252b, and a port of the second CPU (CPU B) of the DPE 254 may be connected C4 to another LCC (LCC B) of the DAE 252b. For purposes of reference and illustration in FIG. 4 and others herein, connections illustrated as being between left sides of enclosures may be referred to as "A" connections and connections illustrated as being between right sides of enclosures may be referred to as "B" connections. For DPE-DAE "A" connections between DPE 254 and DAEs 252*b*, 252*d*, (e.g., C3, C7), each of the connections may represent a connection between CPU A of DPE 254 and LCC A of the respective DAE 252*b* or 252*d*. For DPE-DAE "B" connections between DPE 254 and DAEs 252*b*, 252*d*, (e.g., C4, C8), each of the connections may represent a connection between CPU B of DPE 254 and LCC B of the respective DAE 252*b* or 252*d*.

For DAE-DAE "A" connections between first and second DAEs represent connections between LCC A of the first DAE and LCC A of the second DAE. For example, C5 represents such an A connection between DAE 252*a* and DAE 252*b* and C9 represents such an A connection between DAE 252*c* and 252*d*. Similarly, DAE-DAE "B" connections between first and second DAEs represent connections between LCC B of the first DAE and LCC B of the second DAE. For example, C6 represents such a B connection between DAE 252*a* and DAE 252*b* and C10 represents such a B connection between DAE 252*c* and 252*d*. CPU A and CPU B of DPE 254 may communicate, respectively, with SPS A 256*a* and SPS B 256*b* over connections C1*a* and C2*a*, respectively, to obtain state information about 256*a*, 256*b*, for use with techniques herein.

As illustrated, a chain of one or more DAEs may be connected to a CPU port of the DPE. In this example 250, a first chain of DAEs 252*a* and 252*b* may be connected to DPE 254 and a second chain of DAEs 252*c* and 252*d* may be connected to DPE 254.

In the exemplary embodiment of FIG. 4, the SPSs 256*a*, 256*b* may provide power to the DPE and not to any of the DAEs upon a primary power failure. The DPE includes disks or other non-volatile storage so that the storage processors of the DPE may store any necessary data, such as from cache, to non-volatile storage.

Figure 5:
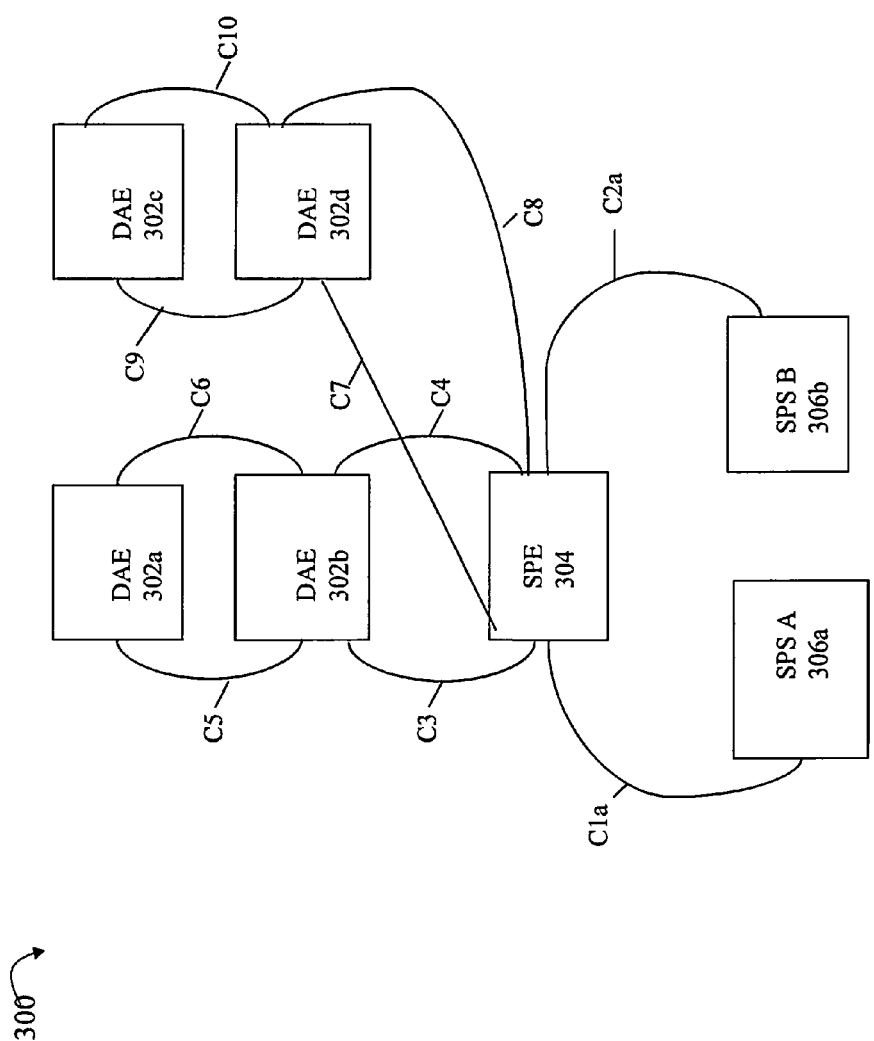

Referring to FIG. 5, shown is an example of a physical layout or arrangement of enclosures and SPSs (standby power supplies) in an embodiment of a data storage system including a SPE and multiple DAEs. The example 300 includes SPE 304, 4 DAEs denoted 302*a*-*d*, and two SPSs 306*a*, 306*b*. Connections C1-10 illustrate communication connections between enclosures for use in with techniques herein in a manner similar to that as described and illustrated with FIG. 4 with the difference that the arrangement includes SPE 304 rather than DPE 254. As described in more detail elsewhere herein, the connections C3-C10 may be used to obtain energy information from the enclosures. Connections C1*a* and C2*a* may be used to obtain information from the data storage system SPSs about the state of the SPSs for use in determining energy information about the SPSs.

In the exemplary embodiment of FIG. 5, the SPSs 306*a*, 306*b* may provide power to the SPE and a single DAE, such as DAE 302*b*, upon a primary power failure. The DAE includes disks or other non-volatile storage so that the storage processors of the SPE may store any necessary data, such as from cache, to non-volatile storage of the DAE powered by the SPSs.

In connection with techniques herein, each CPU or storage processor of the data storage system of a first enclosure (e.g., as may included in either an SPE or a DPE) may periodically collect energy information (e.g., such as by polling) from the other enclosures, SPS A, SPS B, and also from components of the first enclosure. In one embodiment, the energy information collected from an enclosure relates to power consumption and temperature. The power consumption may be with respect to consumption of external power from a source external to the data storage system. For example, the power consumption may related to the amount of a primary external power supply consumed.

Figure 6:
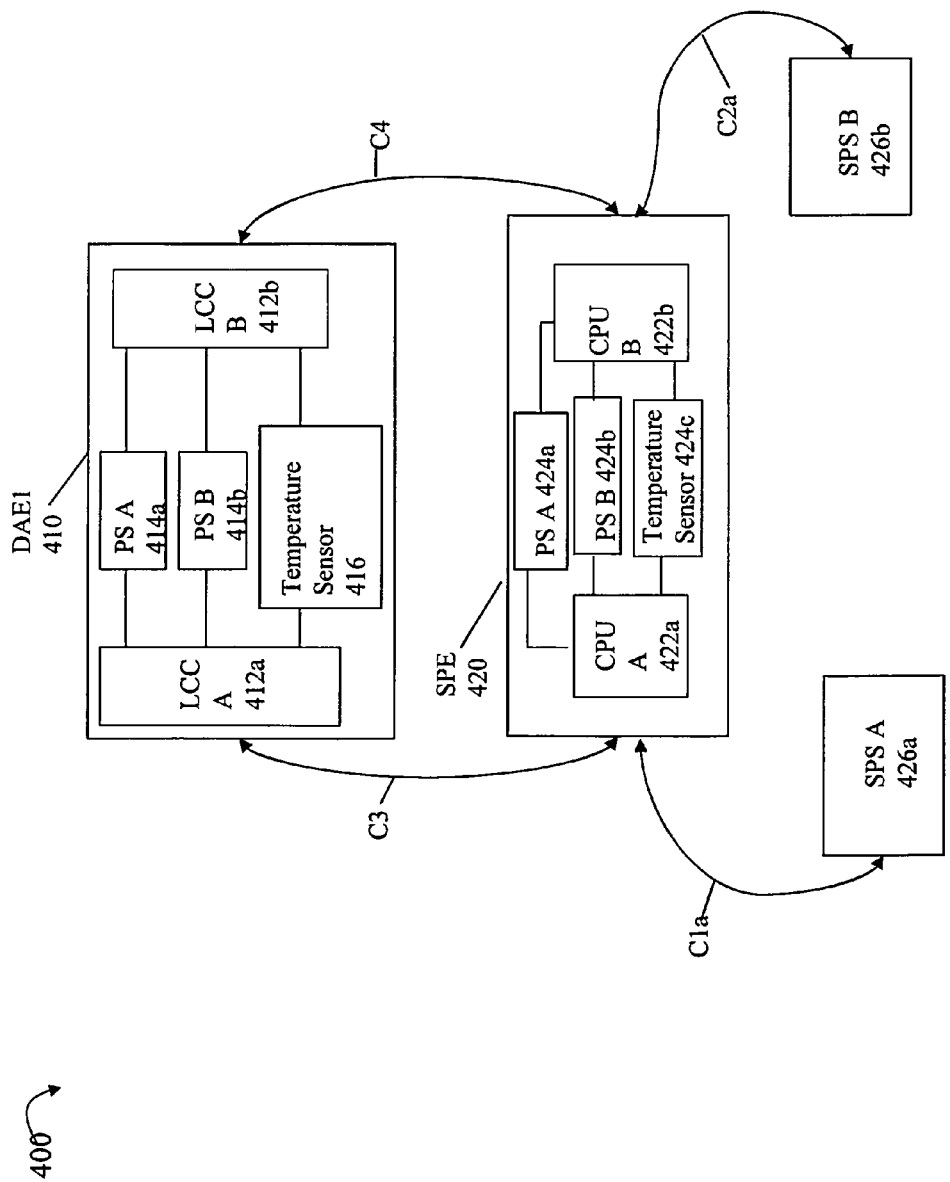

FIG. 6 illustrates in further detail SPE 420 collecting energy information about the SPE 420 itself and also connected enclosure DAE1 410, SPS A 426*a* and SPS B 426*b*. At a point in time such as upon the occurrence of a polling interval, each of the CPUs 422*a*, 422*b* may initiate requests to the components 426*a* and 426*b* and the enclosure 410 for energy information over the illustrated connections C1-C4. In response, the requested information may be returned over the foregoing connections. In particular, CPU A 422*a* may issue requests for energy information over C1*a* and C3; and CPU B 422*b* may issue requests for energy information over C2*a* and C4. Connection C3 is between CPU A 422*a* and LCC A 412*a*. Components of DAE1 410 provide the requested energy information to CPU A 422*a* through the LCC A 412*a*. In this example, PS A 414*a* and PS B 414*b* may each report current power consumption through LCC A 412*a*. Temperature sensor 416 may report the current ambient temperature for the enclosure DAE1 410 through LCC A 412*a*. The foregoing power consumption and temperature information, collectively referred to as energy information, may be returned to CPU A 422*a* over connection C3. In a similar manner, CPU B 422*b* may request and receive energy information of DAE1 410 over connection C4. In this way, assuming CPU A 422*a* and CPU B 422*b* each issue a query at the same time to DAE 1, the CPUS 422*a*, 422*b* may receive duplicate or replicate energy information regarding power consumption by power supplies 414*a*, 414*b* and ambient temperature from sensor 416. Each of the CPUs 422*a*, 422*b* may collect multiple power consumption metric values from DAE1 and aggregate such values to determine a single power consumption metric at the enclosure level for DAE 1 at a point in time. As described, each PS within an enclosure may report a single power consumption value. The single value may represent the current power consumption at a single point in time such as at the point in time of the query. Each CPU may poll at predetermined time periods, such as at a predetermined fixed polling interval.

An embodiment may use standard SCSI commands to issue the foregoing query or request from the SPE to other enclosures and components external to the SPE, and return the requested energy information to the SPE. Each of the CPUs 422*a*, 422*b* of the SPE 420 may also communicate with internal components within the SPE 420 to obtain enclosure-level energy information about the SPE 420 itself. For example, CPU A 422*a* may collect energy information of SPE-internal components, such as 422*b*, 424*a*, 424*b*, and 424*c*, using communication connections between the SPE-internal components. In a similar manner, CPU B 422*b* may collect other energy information of SPE-internal components, such as 422*a*, 424*a*, 424*b*, and 424*c*, using communication connections between the SPE-internal components.

If a chain of other DAE enclosures is connected to DAE1 410 such as illustrated and described in FIGS. 4 and 5, each enclosure may have an enclosure address or identifier and each CPU polls each enclosure based on the enclosure addresses. If there is a chain of connected enclosures, the CPU may poll the chain. For example, if a CPU A 422*a* is connected directly to DAE 1 410, and DAE 1 410 is then connected to a second DAE2, CPU A 422*a* polls the second DAE 2 indirectly through DAE 1 410 which may receive the request for DAE2 and then forward the request down the chain of one or more other connected enclosures. Similarly, information may be forwarded from the enclosures in the chain to the CPU either directly or indirectly through another enclosure depending on the connections and arrangement.

In one embodiment, the energy information reported and collected for each SPS 426a, 426b may be related to power consumption. The power consumption of each SPS 426a, 426b may be estimated based on a current state of the SPS as determined at a polling interval. Each SPS may be in one of a plurality of states. For example, in one embodiment, the SPS may be in one of three states—pass through, recharging, or battery online/in use. For example, if the SPS is in the online/in use state, then the estimate of primary power consumption is determined to be 0 (e.g., no AC power is consumed from an external power source, only using SPS-supplied power). When in the pass-through state, the SPS may be charged and ready for use in the event of a primary power source failure. When in the pass-through state, the SPS may use very little power so an estimate as to this amount may be made based on a predetermined value. If the SPS is charging/recharging (e.g., such as when the system has switched from backup/SPS to external AC power (primary power), the SPS may be estimated to consume a predetermined amount of external power. Thus, the SPS may have one or more associated states. In response to a polling request in connection with obtaining energy information, each CPU may obtain the current state of each SPS and may estimate externally supplied power currently being consumed by the SPS based on the state of the SPS.

It should be noted that in one particular embodiment as described above, the SPS power consumption may be estimated. More generally, power of the SPS or other component (e.g., such as a PS within an enclosure) and/or power for an enclosure may be estimated (e.g., such as where the component and/or enclosure may use a predetermined amount of power when in a particular state) rather than directly obtaining such measurements, for example, such as with using a sensor. Even more generally, techniques may be used to estimate one or more other metrics alone, or in combination with, power in an embodiment.

It should be noted that each of the data storage system CPUs or storage processors (in the SPE or DPE) may not issue the requests for energy information at a same time and may therefore obtain a different set of values for a same enclosure.

In a manner similar to that as described in connection with FIG. 6 for an SPE, a DPE may also collect energy information from other enclosures and also regarding the DPE enclosure itself.

Each CPU or storage processor may collect and determine energy information for each enclosure (enclosure level) and also aggregate energy information for the data storage system (data storage system level) based on the collective sets of enclosure-level energy information.

Power consumption for an enclosure A may be determined as the sum of power consumption reported by the power supplies (PSs) of the enclosure A. Power consumption for the data storage system may be determined as the sum of power for all enclosures in the data storage system and the SPSs of the data storage system. As will be appreciated by those skilled in the art, the total power consumption for the data storage system may generally include any power used by enclosures and SPSs as described herein as well as other components that may be included in an embodiment.

In one embodiment, energy information collected such as using polling described herein may be retained for a window of time, such as one hour. The CPUs or storage processors may poll all the enclosures and SPSs for information at a predetermined time interval, such as every 30 seconds. For example, in an embodiment with a DPE and DAEs, each CPU in the DPE may send its polling request in response to a timer maintained and used by the CPU. In response, the CPU may send the polling request to each other external enclosure, each SPS of the data storage system, and also collect information about the DPE itself such as by communicating to the DPE's temperature sensor, power supplies, and the like using internal connections within the DPE.

On a per enclosure level, an embodiment may collect and determine power and temperature information each polling interval. The power information may represent an enclosure-level aggregate metric of the power supplies. Also, for each polling period, for a 1 hour time window (which shifts forward each polling interval), the maximum, average and current power consumption and the maximum, average and current temperature may be determined for each enclosure. The current power consumption for a polling interval may represent the aggregate power consumption for the enclosure at that single point in time at which the polling interval occurs. The power consumed by an enclosure ENC at a point in time, t, may be represented as:

$$\text{Power ENC}(t) = \text{Input power to power supplies of enclosure} \quad \text{EQUATION 1}$$

The power metric for an enclosure represented by EQUATION 1 may represent the aggregate amount of power consumed at a point in time by the enclosure from a primary or external power source (e.g., other than as may be supplied by SPSs of the data storage system). As described elsewhere herein, one or more values used in connection with power and other metrics herein may be measured and/or estimated.

For an enclosure, the average power consumption may be determined as the mathematical average of the power consumption over the 1 hour time window or other time period. The values used to determine the foregoing average may be based on the sum of the current power consumption values (represented by EQUATION 1) occurring during the one hour window divided by the total number of such values. More generally, the window of time over which the average is determined may span a time interval X through Y, inclusively, having "n" corresponding polling instances, 1 to n, where each of 1 . . . n represents a polling interval at which a current power consumption value for the enclosure may be obtained as using EQUATION 1. In this case, the average power consumption value for an enclosure ENC during the time interval X . . . Y inclusively, having "n" polling instances of energy information may be represented as:

$$\text{Ave Power } ENC\,(X,Y) = \frac{\sum_{t=X}^{Y} PowerENC(t)}{n} \quad \text{EQUATION 2}$$

The maximum power consumption for an enclosure may be the largest power consumption value determined for the enclosure during the one hour or other time window. In other words, the maximum power consumption for the enclosure may be the largest value determined using EQUATION 1 during a one hour or other time window. In a manner similar to that as described herein for enclosure level power consumption values, current, average and maximum temperature values may also be determined for each enclosure. Also, an embodiment may similarly calculate current, average and maximum power consumption values for each SPS based on estimated power values determined in accordance with state information of each SPS as described elsewhere herein.

Similarly, an embodiment may also determine current, average and maximum power consumption values for the data storage system level. At a point in time, t, current power consumption of the data storage system (DS) may be the sum of the power consumption of all enclosures and SPSs of the data storage system (DS) as represented by:

Power DS(*t*)=Sum of power consumed for all enclosures+Power consumed by SPSs of data storage system           EQUATION 3 where the "Sum of power consumed for all enclosures" is the sum of all power consumption values determined for all enclosures (e.g. each power consumption value for an enclosure may be determined using EQUATION 1).

The data storage system (DS) average power consumption may be determined as the mathematical average of the data storage system power consumption over the 1 hour time window or other time period. The values used to determine the foregoing average may be based on the sum of the current power consumption values for the data storage system level (represented by EQUATION 3) occurring during the one hour window divided by the total number of such values. More generally, the window of time over which the average is determined may span a time interval X through Y, inclusively, having n corresponding polling instances, 1 to n, where each of 1 ... n represents a polling interval at which a current power consumption value for the data storage system may be obtained as using EQUATION 3. In this case, the average power consumption value for the data storage system (DS) during the time interval X ... Y inclusively, having "n" polling instances of energy information may be represented as:

$$\text{Ave Power } DS\ (X, Y) = \frac{\sum_{t=X}^{Y} PowerDS(t)}{n} \quad \text{EQUATION 4}$$

The maximum power consumption for the data storage system level (aggregated for the entire data storage system) may be the largest power consumption value determined for the data storage system during the one hour or other time window. In other words, the maximum data storage system level power consumption may be the largest value determined using EQUATION 3 during a one hour or other time window.

An embodiment may perform two level sampling of the current power consumption metric for each enclosure. In connection with two-level sampling for determining a current power consumption for an enclosure, the enclosure may be polled in accordance with a first interval or frequency and then multiple such polling values may be used to determine an average every second interval or frequency. For example, each enclosure may be polled for power consumption information every 3 seconds and then determine a 30 second power consumption based on the average of power consumption over the 30 second interval. For example, an embodiment may obtain 10 values for the power consumption metric during a 30 second time interval, each such value obtained by polling at 3 second intervals. The average of all the foregoing values may be determined and used for calculating the enclosure level aggregate power consumption metric every 30 seconds. For power consumption metric, poll enclosures every 3 seconds and calculate the power consumption metric every 30 seconds. The foregoing power consumption metric determined every 30 seconds may be used as the current power consumption metric for the enclosure as represented by EQUATION 1. The foregoing two level sampling with respect to power consumption for an enclosure may be performed to compensate for the possible variations and fluctuations in power consumption at different points in time. In contrast, temperature changes for an enclosure occur more slowly and are not generally susceptible to as much variation with the 30 second time intervals. Therefore, a single temperature reading may be obtained for each 30 second time interval without performing a two-level sampling as for power consumption metrics for each enclosure.

It should be noted that the foregoing use of two-level sampling, or more generally, multiple or N-level sampling, wherein N>1, may be used in an embodiment in connection with power consumption for an enclosure. However, such multiple level sampling may be used in connection with other metric values for an enclosure, component within an enclosure, component not within an enclosure (e.g., such as the SPS), and the like.

Figure 7:
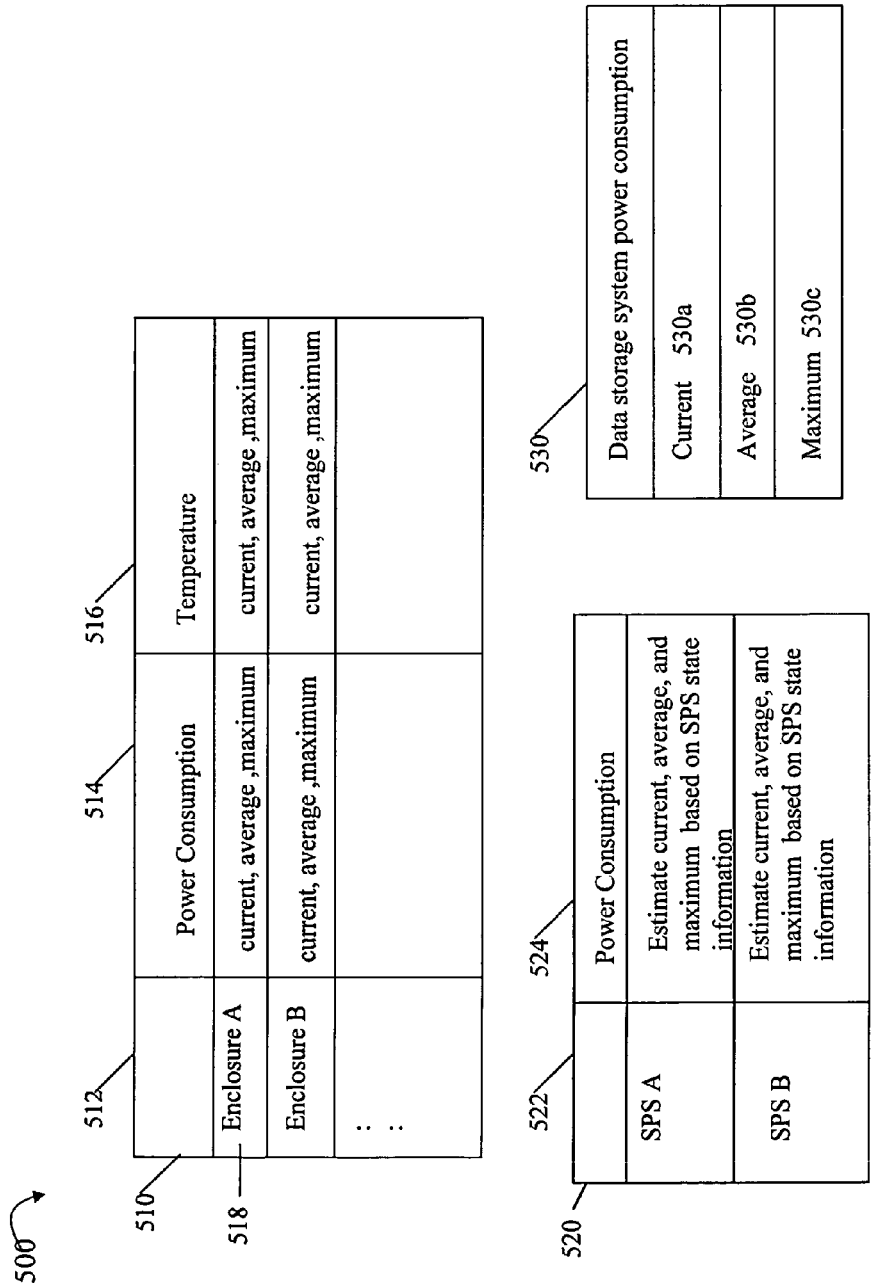
FIG. 7 is an example illustrating energy information that may be determined in an embodiment in accordance with techniques herein.

Referring to FIG. 7, shown is an example of energy information that may be collected and determined for a data storage system and its enclosures and SPSs in an embodiment in accordance with techniques herein. The example 500 includes a table 510 of energy information that may be determined for each enclosure upon the occurrence of each polling interval, such as every 30 seconds as noted above. The table 520 includes energy information that may be determined for each SPS of the data storage system each polling interval, such as every 30 seconds. The table 530 includes data storage system level energy information that may be determined for the data storage system, in the aggregate, each polling interval such as every 30 seconds.

The table 510 includes a first column 512 denoting enclosures in the data storage system, a second column 514 denoting three power consumption metrics and a third column 516 denoting three temperature metrics. Energy information for a single enclosure is included in a row of the table 510. For example, element 518 denotes an entry including energy information for enclosure A including current, average and maximum power consumption values and current, average, and maximum temperature values for the enclosure A. The current, average and maximum power consumption values for an enclosure as included in an entry of 514 may be determined as described above with respect to a window of time, such as one hour, which advances each polling period. In a similar manner, the current, average and maximum temperature values for a enclosure as included in an entry of 516 may be determined as described above with respect to a window of time, such as one hour, which advances each polling period. It should also be noted that the foregoing set of temperature information (e.g., including current, average and maximum), may be obtained for one or more temperature metrics. As described herein with respect to an enclosure, an embodiment may obtain an external temperature measurement or an ambient inlet temperature indicating the temperature of air surrounding the enclosure/entering the enclosure. Also an embodiment may obtain an enclosure internal temperature which varies and is impacted by the enclosure's functional components.

The table 520 includes an estimate of the power consumption of each SPS of the data storage system based on the state of each SPS. Exemplary states and associated estimated power consumptions for each SPS are described above. In one embodiment as illustrated in connection with 520, current, average and maximum power consumption values may be determined for each SPS such as based on the estimated power consumption values in accordance with the different SPS states. The power consumption values of 520 may be determined as described above with respect to a window of time, such as one hour, which advances each polling period.

The table 530 includes data storage system level power consumption values. The current, average and maximum power consumption values for the data storage system as included in 530 may be determined as described above with respect to a window of time, such as one hour, which advances each polling period.

Additionally, it should be noted that an embodiment may store the determined current power consumption values for each enclosure and for the data storage system for the window of time in order to determine the average and maximum each polling interval. With each polling interval, the oldest one of the power consumption values representing power consumption for a single point in time is dropped or removed and the newest or current power consumption value for the most current point in time is stored. In a similar manner, values may be maintained and used when determining the average and maximum values for enclosure level temperature metrics and SPS power consumption values.

An embodiment may take one or more actions in response to the collected energy information. For example, an embodiment may specify thresholds with respect to power consumption and/or temperature at the enclosure level and/or data storage system level. Furthermore, different thresholds and/or actions may be specified for each of the current, average and/or maximum power consumption values and/or temperature values described herein. Using techniques herein, an embodiment may monitor power consumption and/or temperature at the enclosure level and/or the data storage system level and provide for allowing a system to automatically take actions proactively prior to reaching the threshold(s). Following paragraphs set forth various examples illustrating use of such techniques. For example, prior to reaching an enclosure-level threshold for power consumption, an embodiment may selectively power down or stop operation of drives within a particular enclosure. Similarly, an embodiment may selectively power up or start operation of selective drives in an enclosure. If one or more physical devices are not configured to include LUNs thereon, this means that there is no user data stored on these physical devices. Therefore, such physical devices may be not be powered on/up, or may be selected for powering down or off prior to other drives containing user data. An embodiment may selectively spin up drives sequentially based on a defined policy and power requirements of drives and a power consumption threshold rather than start/spin up all physical drives at once.

If temperature and/or one or more power consumption metrics approaches an associated threshold, an embodiment may spin down one or more drives selectively. For example, an embodiment may specify one or more levels of power consumption thresholds. For example, if threshold=1000 watts, an embodiment may define a first level 800 watts and a second level 900 watts. When the enclosure power consumption reaches the first level, a first action may be taken such as send a notification message to a manager that another action will be automatically taken if enclosure power consumption continues to rise and reaches the second level. If the power consumption then reaches the second level, the data storage system may automatically take a proactive action such as selectively spin down one or more drives. The drives selected may be ones that are not configured for storing any user data, ones selected having a particular type of data, a particular application's data, and the like. As another example, an embodiment may have a temperature threshold X with respect to temperature within an enclosure. When the current temperature in an enclosure is within a predetermined amount of that threshold (e.g., having a value of Y), the system may perform one or more actions in attempts to avoid or minimize further temperature increases. For example, when the temperature within an enclosure reaches a first level Y, Y<X, the system may selectively spin down one or more drives in the enclosure, turn on one or more enclosure fans, and/or send a notification to the system manager such as via email, management console, and the like, reporting on the data storage system event and actions automatically performed. Such actions may be performed to avoid further temperature increases and to avoid reaching a temperature threshold Y. As another example, if power consumption for the data storage system is approaching a threshold or within a predetermined amount of a threshold, actions may include selectively spinning down drives within one or more enclosures, spinning down all drives within a single enclosure if such drives currently do not include user data (e.g., no LUN configuration), and the like.

With respect to temperature for an enclosure, two types of temperature metrics are described herein. A first temperature metric may indicate the ambient temperature of air coming into the enclosure and thus provide enclosure-external or surrounding temperature information. A second temperature metric may indicate the temperature within the enclosure. The preventive techniques such as described above provide examples of actions that may be taken to possibly reduce temperature within the enclosure (e.g., the second temperature metric). However, an embodiment may not take such actions in efforts to reduce the first temperature metric since such actions may be ineffective in reducing the temperature of the environment surrounding the enclosure (e.g., external to the enclosure and/or data storage system). Rather, as the current temperature for the enclosure-external temperature approaches one or more defined thresholds, it may be necessary to spin down drives with the goal of avoiding data loss rather than attempting to reduce temperature An embodiment monitoring both of the foregoing temperature metrics may also note when the enclosure internal temperature and enclosure external temperature are approximately the same or within a threshold amount of each other (e.g., where the threshold is used to determine whether there is a significant difference between the metrics). If both temperature metrics are within a threshold amount of each other, an embodiment may determine that the actions taken to reduce enclosure-internal temperature are moot and simply proceed with powering down all devices in the enclosure to avoid possible data loss.

In connection with the techniques herein, an embodiment has the ability to monitor energy information at the enclosure level and data storage system level in order to diagnose problems proactively. Actions taken may include notification and/or automatically performing a corrective action. An embodiment may define a plurality of thresholds or level and may accordingly take different actions at each level. The thresholds and/or actions may be defined at the enclosure-level and also at the data storage system level.

If temperature and/or power consumption for an enclosure exceeds or approaches one or more defined thresholds, the system may automatically perform an action in accordance with one or more attributes of the data stored on devices of the enclosure. For example, if the data is critical user data, the data storage system may migrate data to another device in another enclosure. Such a decision may also be made by observing power and/or temperature values over a period of time or history. For example, one or more thresholds for temperature and/or power consumption may be exceeded or approached (e.g. within a predetermined amount without exceeding) a number of times within a defined time period. To further illustrate, if the temperature within an enclosure has been exceeded or within a predetermined amount 3 times within a defined time period such as a day or week, upon the third such occurrence, the responsive action may be to automatically migrate data from the devices in the enclosure to another enclosure. Migration may be to another device having similar performance characteristics and of a similar drive type. Such actions may be taken to proactively minimize the possibility of any data loss.

A data storage system may provide for different defined storage tiers. Each tier may generally include physical storage devices or drives having one or more attributes associated with a definition for that tier. For example, an embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD drive (such as a flash drive), a particular type of SSD drive (such using flash or a form of RAM), a type of magnetic disk or other non-SSD drive, and the like. Data protection may specify a type or level of data storage protection such, for example, as a particular RAID level (e.g., RAID1, RAID-5 3+1, RAIDS 7+1, and the like). Performance characteristics may relate to different performance aspects of the physical storage devices of a particular type or technology. For example, there may be multiple types of magnetic disk or spinning media type of FC drives based on the RPM characteristics of the FC drives (e.g., 10K RPM FC drives and 15K RPM FC drives) and FC drives having different RPM characteristics may be included in different storage tiers. Storage capacity may specify the amount of data, such as in bytes, that may be stored on the drives. An embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all FC drives which are a type of magnetic disk or other spinning media type, and a third tier of all SATA (Serial Advanced Technology Attachment) drives which are a type of magnetic disk or other spinning media type. The foregoing are some examples of tier definitions and other tier definitions may be specified in accordance with techniques herein. In such an embodiment having different storage tiers when migrating data as described above, the data may be migrated from devices of a first storage tier to other devices within the same storage tier or another tier having the same or similar attributes and performance characteristics. When migrating to a device in another storage tier, an embodiment may select a target tier having a portion of attributes which are the same as, or similar within predetermined limits/thresholds, with respect to those attributes of the source tier. An embodiment may select a target tier from multiple tiers having an adequate amount of storage and having a largest number of attributes which match (or substantially match within predetermined limits/thresholds) those of the source tier Furthermore, power consumption (a single value or range) of a physical device may be an attribute of a storage tier definition. In this case, when a determination is made to perform an action to reduce power consumption, an embodiment may identify candidate devices for power down and/or up based on the particular storage tier. As another example, if there is a need to reduce power consumption, data may be migrated from devices of a first storage tier consuming a first amount of power to devices in a second storage tier consuming an amount of power less than the first amount. Migrating all data to lower power consuming devices may be preferrable, for example, to powering down some devices. Furthermore, when migrating data, an embodiment may migrate data from a first storage tier to a second storage tier where both such tiers have the same (or substantially the same within a threshold amount) power consumption attribute.

As yet another example, power information for an enclosure may be associated with a particular set of application data using devices in the enclosure. An embodiment may determine energy-oriented costs and charges to a customer based on the amount of power consumed in connection with storing the customer's application data on the devices in the enclosure.

Management software may also track energy information for relatively long periods such as, for example, for days, weeks, and the like. Using such information, analysis may be performed to determine trends or patterns of particular enclosure(s), and/or component(s) to take appropriate corrective and/or preventive actions.

In an embodiment in which the enclosures include both SSD devices and non-SSD or disk devices, the SSDs may generally consume less power and may generate less heat than non-SSD devices. Based on the foregoing, an embodiment may include performing actions in accordance with the types and characteristics of the physical storage devices. For example, in order to decrease temperature or reduce power consumption for the data storage system, an action may selectively spin down or turn off disk devices rather than SSD devices since SSDs tend to generate less heat and consume less power than disk devices.

Actions taken may be based on characteristics of the physical devices (e.g., SSD vs. non-disk) as described above, device configuration (e.g., which physical devices are configured or not configured for user data, which physical devices are used in different RAID group configurations so that, for example, all devices on a per RAID group level may be turned on/off), data stored on devices (e.g., whether data is critical or can be made unavailable by taking devices storing the data offline), and the like.

As another example, consider a single enclosure having two power supplies and a first power supply is in a state such that it is unable to supply power to enclosure components but the internal fans of the first power supply may still operate and use power from other second power supply. Thus, the power consumption threshold for the enclosure may be lowered to account for the single second power supply and also the increased demand on that power supply to run the internal fans of the first power supply. Actions taken to decrease the enclosure temperature, should the current enclosure temperature approach the temperature threshold, may include turning on the internal fans of the first power supply. Otherwise, to decrease power consumption for the enclosure, the internal fans of the first power supply may not be operated. To control temperature, an enclosure may have the option to turn on/off enclosure fans and/or fans integrated within the first power supply. Also, to control power consumption, actions may include selectively turning on/off fans of the foregoing first power supply and/or enclosure.

Figure 8:
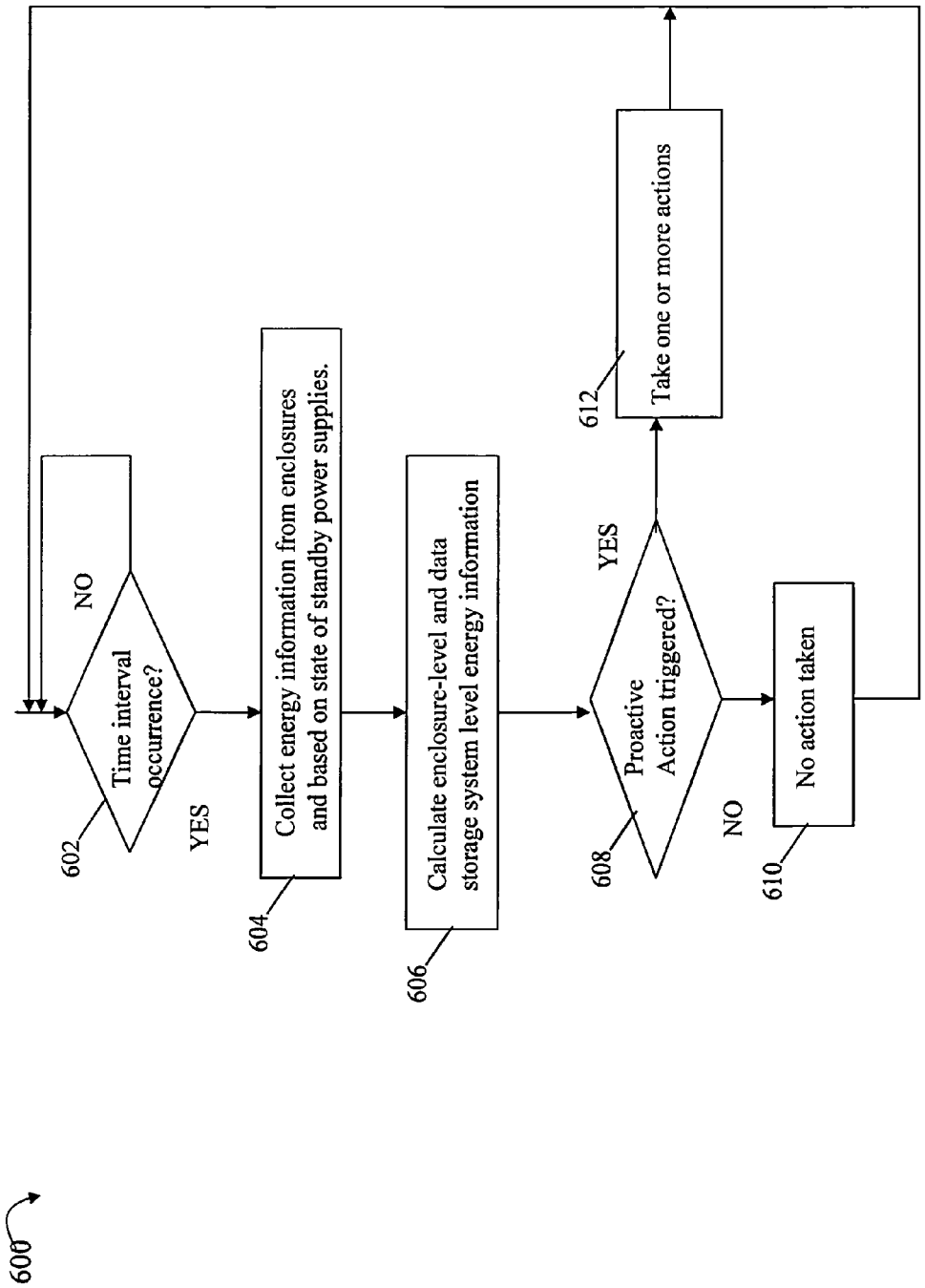
FIG. 8 is a flowchart of processing steps that may be performed in an embodiment in accordance with techniques herein.

Referring to FIG. 8, shown is a flowchart of processing steps that may be performed in an embodiment in accordance with techniques herein. The flowchart 600 summarizes processing as described above. At step 602, a determination may be made as to whether a time interval occurrence, such as the polling interval of 30 seconds, has occurred. If not, control remains at step 602 until the occurrence of the next polling interval. If step 602 evaluates to yes, control proceeds to step 604 where energy information is collected from the enclosures and based on the state of the SPSs of the data storage system. As described above, an embodiment also perform two-level sampling for power consumption for each enclosure. In such an embodiment, additional processing steps may be performed to collect the power consumption information at a first polling interval, such as every 3 seconds, and calculate the power consumption for the enclosure for a second time interval, such as 30 seconds, used in connection with step 602, where the calculation of the power consumption for the second time interval is used as the current power consumption for the enclosure.

From step 604, control proceeds to step 606 to calculate the enclosure-level and data storage system level energy information. Step 604 may include determining the energy information used to populate the tables of the example 500. At step 608, a determination is made as to whether an action is triggered based on any one or more metrics of the energy information of FIG. 7 and one or more associated thresholds. If so, control proceeds to step 612 to take one or more actions and then to step 602. Otherwise, if step 608 evaluates to no, control proceeds to step 610 where no action is taken and then to step 602.

As described above, each individual enclosure of a data storage system has the ability to report one or more energy information metrics regarding its own power consumption and ambient temperature. Current, average, and maximum power consumption values may be maintained over a specific window of time with sampling done at a specific intervals for each enclosure and also at the data storage system level. The techniques herein collect the energy information from the individual enclosures and performs calculations on the data at both the enclosure and system levels. The calculated data can then be used to manage the Storage System in a more efficient manner. A user of the data storage system may specify one or more power consumption and/or temperature thresholds and the system software can automatically take actions to help prevent the system from hitting those thresholds. As described herein, such actions may include powering down or not powering up components (e.g., selected drives within one or more enclosure, all drives within one or more enclosures) that do not affect the availability of the user's data (e.g., power down drives that are not part of a RAID group or selectively power down one or more drives that do not include storage configured as LUNs for user data). Power Consumption is a more dynamic type of data (e.g., constantly changing and can have a large difference from measurement to measurement) than, for example, temperature. To minimize the possible affect that any large increase or decrease in power may cause at various points in time, an embodiment may use techniques such as the two-level sampling described herein for power consumption readings per enclosure. The techniques herein provide many advantages. For example, data storage system software has knowledge about the power consumption of the entire data storage system as well as individual enclosures. Thus, an embodiment may perform actions to reduce data storage system power consumption including ones which selectively reduce consumption by powering down drives in any enclosure of the array. The techniques herein may monitor temperatures across all enclosures of the system and may attempt to avoid reaching threshold temperature conditions within enclosures by pro-actively powering down selective drives. The data storage system may have knowledge about RAID Group and LUN configurations and may use such information in determining what physical drives may be powered down without affecting access to user data.

It should be noted that the techniques described herein for use with energy information may more generally be used in connection with any type of environmental information and may include metrics related to other environmental aspects in which the data storage system operates. For example, the techniques herein may be used in connection with metrics related to humidity using measured and/or estimated values. The enclosures, particular components, number of each component, and arrangements of such enclosures described herein are exemplary of those which may be used in an embodiment of a data storage system or, more generally, a system in accordance with techniques herein. As will be appreciated by those of ordinary skill in the art, an enclosure in an embodiment may include other components such as, for example, one or more switches, as well as other sensors that may be used in connection with obtaining other metrics alone or in combination with those described herein. Generally, any of the metric values obtained and used in connection with techniques herein may be measured and/or estimated as may vary with the availability of particular sensors and ability to obtain direct measurements.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for managing a data storage system comprising:
   determining first energy information for each of one or more enclosures of the data storage system, each of said enclosures including components of the data storage system;
   determining second energy information for the data storage system based on information including the first energy information for the one or more enclosures, wherein the second energy information includes an estimate of power consumed by standby power supplies based on a state of each of said standby power supplies;
   determining whether any of said first energy information for each of the one or more enclosures and said second energy information for said data storage system are within a predetermined amount of one or more associated thresholds; and
   if it is determined that any of said first energy information for each of the one or more enclosures and said second energy information for said data storage system are within a predetermined amount of one or more associated thresholds, taking one or more actions prior to reaching said one or more associated thresholds.

2. The method of claim 1, wherein said first energy information for each enclosure of the data storage system includes a power consumption metric and a temperature metric.

3. The method of claim 1, wherein said determining first energy information for each of the one or more enclosures includes polling each of the one or more enclosures for information on power consumption and temperature.

4. The method of claim 1, wherein each of said enclosures includes one or more of a computer processing unit, a storage device, a power supply, an external interface component, and a fan.

5. The method of claim 1, wherein a first of said one or more actions is performed in accordance with attributes of physical storage devices of the data storage system.

6. The method of claim 5, wherein said first action includes selectively powering on or powering off a storage device.

7. The method of claim 1, wherein a first of the one or more actions is performed in accordance with data storage configurations.

8. A method for managing a data, storage system comprising:
   determining first enemy information for each of one or more enclosures of the data storage system, each of said enclosures including components of the data storage system;
   determining second energy information for the data storage system based on information including the first energy information for the one or more enclosures;
   determining whether any of said first energy information for each of the one or more enclosures and said second energy information for said data storage system are within a predetermined amount of one or more associated thresholds; and
   if it is determined that any of said first energy information for each of the one or more enclosures and said second energy information for said data storage system are within a predetermined amount of one or more associated thresholds, taking one or more actions prior to reaching said one or more associated thresholds, and
   wherein said determining first energy information for each of the one or more enclosures includes polling each of the one or more enclosures for information on power consumption and temperature and the method further comprises:
      polling each of the one or more enclosures for power consumption information for each occurrence of a first time interval;
      polling each of the one or more enclosures for temperature information for each occurrence of a second time interval; and
      determining, for each of the one or more enclosures, a current power consumption metric at each occurrence of the second time interval using power consumption information collected during a plurality of occurrences of the first time interval.

9. The method of claim 8, wherein, at each occurrence of said second time interval, an average power consumption and a maximum power consumption are determined for each of said one or more enclosures with respect to energy information collected for said each enclosure during a predetermined time window, and wherein, at each occurrence of said second time interval, an average temperature and a maximum temperature are determined for each of said one or more enclosures with respect to temperature information collected for said each enclosure during said predetermined time window.

10. The method of claim 8, wherein, at each occurrence of said second time interval, an average power consumption and a maximum power consumption are determined for the data storage system with respect to energy information collected during a predetermined time window, and wherein, at each occurrence of said second time interval for each standby power supply, a current, average and maximum amount of power consumed by said each standby power supply are determined with respect to energy information collected during said predetermined time window.

11. A method for managing a data storage system comprising:
   determining first energy information for each of one or more enclosures of the data storage system, each of said enclosures including components of the data storage system;
   determining second energy information for the data storage system based on information including the first energy information for the one or more enclosures;
   determining whether any of said first energy information for each of the one or more enclosures and said second energy information for said data storage system are within a predetermined amount of one or more associated thresholds; and
   if it is determined that any of said first energy information for each of the one or more enclosures and said second energy information for said data storage system are within a predetermined amount of one or more associated thresholds, taking one or more actions prior to reaching said one or more associated thresholds, and wherein said one or more actions include selectively powering down or up a component of the data storage system based on an amount of power consumed by the component as defined in accordance with a first storage tier including said component, said first storage tier being one of a plurality of defined multiple storage tiers, and sending a user notification.

12. A method for managing a data storage system comprising:
   determining first energy information for each of one or more enclosures of the data storage system, each of said enclosures including components of the data storage system;
   determining second energy information for the data storage system based on information including the first energy information for the one or more enclosures;
   determining whether any of said first energy information for each of the one or more enclosures and said second energy information for said data storage system are within a predetermined amount of one or more associated thresholds; and
   if it is determined that any of said first energy information for each of the one or more enclosures and said second energy information for said data storage system are within a predetermined amount of one or more associated thresholds, taking one or more actions prior to reaching said one or more associated thresholds, wherein a first of said one or more actions is performed in accordance with attributes of physical storage devices of the data storage system, said first action includes selectively powering on or powering off a storage device, and said first action selects a device and considers whether the device is a disk device or a solid state storage device.

13. A method for managing a data storage system comprising:
- determining first energy information for each of one or more enclosures of the data storage system, each of said enclosures including components of the data storage system;
- determining second energy information for the data storage system based on information including the first energy information for the one or more enclosures;
- determining whether any of said first energy information for each of the one or more enclosures and said second energy information for said data storage system are within a predetermined amount of one or more associated thresholds; and
- if it is determined that any of said first energy information for each of the one or more enclosures and said second energy information for said data storage system are within a predetermined amount of one or more associated thresholds, taking one or more actions prior to reaching said one or more associated thresholds, wherein a first of the one or more actions is performed in accordance with data storage configurations and wherein said first action selects a device for powering on or powering off and considers whether the device is currently configured for user data.

14. The method of claim 13, wherein the first action selects a device for powering off which is not configured for storing user data.

15. A method for managing a data storage system comprising:
- determining first energy information for each of one or more enclosures of the data storage system, each of said enclosures including components of the data storage system;
- determining second energy information for the data storage system based on information including the first energy information for the one or more enclosures;
- determining whether any of said first energy information for each of the one or more enclosures and said second energy information for said data storage system are within a predetermined amount of one or more associated thresholds; and
- if it is determined that any of said first energy information for each of the one or more enclosures and said second energy information for said data storage system are within a predetermined amount of one or more associated thresholds, taking one or more actions prior to reaching said one or more associated thresholds, wherein a first of the one or more actions is performed in accordance with data storage configurations and wherein said first action selects a device for powering on or powering off and considers whether the device is currently configured in a RAID group.

16. The method of claim 15, wherein said first action powers off or powers on devices on a per RAID group level.

17. A method for managing a data storage system comprising:
- determining first energy information for each of one or more enclosures of the data storage system, each of said enclosures including components of the data storage system;
- determining second energy information for the data storage system based on information including the first energy information for the one or more enclosures;
- determining whether any of said first energy information for each of the one or more enclosures and said second energy information for said data storage system are within a predetermined amount of one or more associated thresholds; and
- if it is determined that any of said first energy information for each of the one or more enclosures and said second energy information for said data storage system are within a predetermined amount of one or more associated thresholds, taking one or more actions prior to reaching said one or more associated thresholds, and wherein a first of the one or more actions includes migrating data from a first device of first enclosure to a second device of second enclosure if the first enclosure has first energy information within a predetermined amount of an associated threshold and data of said first device is categorized as critical data, wherein a plurality of storage tiers are defined, each of said storage tiers including devices having a same set of attributes, said first device belonging to a first storage tier of devices having a first set of attributes, and said second device belongs a second storage tier of devices having a second set of attributes, wherein at least a portion of said first set of attributes are included in said second set.

18. A non-transitory computer readable medium comprising code stored thereon for managing a data storage system, the non-transitory computer readable medium comprising code that:
- determines first environmental information for each of one or more enclosures of the data storage system, each of said enclosures including components of the data storage system;
- determines second environmental information for the data storage system based on information including the first environmental information for the one or more enclosures, wherein the second environmental, information includes an estimate of power consumed by standby power supplies based on a state of each of said standby power supplies;
- determines whether any of said first environmental information for each of the one or more enclosures and said second environmental information for said data storage system are within a predetermined amount of one or more associated thresholds; and
- if it is determined that any of said first environmental information for each of the one or more enclosures and said second environmental information for said data storage system are within a predetermined amount of one or more associated thresholds, takes one or more actions prior to reaching said one or more associated thresholds.

19. A data storage system comprising:
- a first enclosure including a plurality of computer processors;
- a plurality of second enclosures including a plurality of storage devices;
- a non-transitory computer readable medium comprising code thereon that:
  - determines enclosure-level environmental information for each of the first enclosure and plurality of second enclosures;
  - determines data storage system-level environmental information for the data storage system based on information including sets of enclosure-level environmental information for the first enclosure and the plurality of second enclosures, wherein the data storage system-level environmental information includes an estimation of power consumed by standby power supplies based on a state of each of said standby power supplies;

determines whether any of the sets enclosure-level environmental information and the data storage system-level environmental information are within a predetermined amount of one or more associated thresholds; and if it is determined that any of the sets of enclosure-level environmental information and the data storage system-level environmental information are within a predetermined amount of one or more associated thresholds, taking one or more actions prior to reaching said one or more associated thresholds.

20. The data storage system of claim 19, wherein one of said second enclosures is directly connected to said first enclosure and another of said second enclosures is indirectly connected to said first enclosure through said one of said second enclosures.

* * * * *